July 20, 1943.   G. L. BECKER   2,324,476
LAYOUT AND CHECKING DEVICE
Filed March 9, 1939

INVENTOR
GEORGE L. BECKER
By Edgar A. Sudgren
Clyde Kintz
ATTORNEYS

Patented July 20, 1943

2,324,476

UNITED STATES PATENT OFFICE 2,324,476

LAYOUT AND CHECKING DEVICE

George L. Becker, Cleveland, Ohio

Application March 9, 1939, Serial No. 260,761

5 Claims. (Cl. 33—174)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a layout and checking device for parts such as levers, cams, etc. and the proper location of the centers of holes, the outlines of slots, the determination of the angle of one surface with respect to another, etc. This device will enable work that is to be machined to be laid out quickly and precisely. It also will enable machined work to be checked readily and accurately.

It is an object of this invention to provide a laying-out device having a rotatably mounted work-supporting plate, the work-supporting face of the plate being normal to the axis of rotation.

It is another object of this invention to provide in connection with a rotatable work supporting plate, mechanism for accurately determining the angular position of the plate.

It is still another object of this invention to provide in a rotatably mounted work-supporting plate, openings predeterminately located with respect to the center of rotation of the plate and a pin adapted to fit in a selected opening and engage measuring blocks for accurately determining the angular position of the plate.

Other objects will become apparent from the following disclosure.

An illustrative embodiment of this invention is shown in the accompanying drawing in which.

Figure 1:
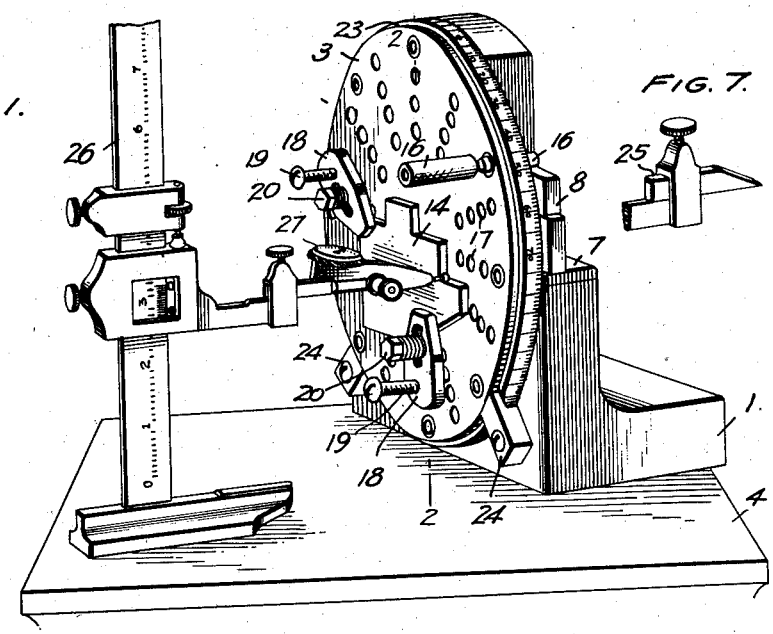
Figure 1 is a perspective view of the apparatus in an adjusted position with a piece of machined work clamped in place.

This device consists of a support 1 which may be made in the shape of an angle adapted to rest upon a commercial surface plate 4. The support is provided with a bearing opening in which is placed a bushing 2 for rotatably mounting an index plate 3 which, in its preferred form, is in the shape of a disk. The support 1 is cut away on one or both sides at 5 to provide steps 6 upon which are fastened, in any convenient manner, hardened, ground and lapped measuring plates 7 at a known distance below the center of rotation of the support bushing 2 (0.200" in the preferred form of the invention plus one-half the diameter of opening 15 or pin 16) and also a known distance from the base of support 1. Plates 7 are adapted to support conventional measuring or gauge blocks 8 of selected dimensions as necessary or desired when using the device and may be referred to as a datum plane. Index plate 3 is provided with a hollow shaft or stud bushing 10 which fits in bearing bushing 2 of support 1 for rotatably mounting the plate. Shaft 10 is fixed to plate 3 by a splined connection as at 9. Lateral movement of plate 3 is controlled by washer 11, nut 12 and lock nut 13 or in any other conventional manner. Adjacent the periphery of plate 3 and at a known distance from the center of the plate supporting shaft (3.500 inches in the preferred form of the invention) are provided openings 15, eight in number spaced 45° apart in the preferred form of the invention, although it is to be understood that the number used and their angular and radial spacing with respect to the center of rotation of the rotatable plate is a matter of selection depending upon the measuring blocks to be used in connection with the device. It is also readily understood that one or more additional series of openings 15 may be provided at different distances from the center bushing to function with different measuring blocks. The openings 15 are precisely located and defined by ground, hardened and lapped bushings into which a locating plug or pin 16 of known diameter is adapted to fit for purposes to be more fully explained. Since the distance from the center of rotation of the plate to the center of an opening represents the hypotenuse of a triangle the base of which lies in a horizontal line through the center of rotation of the plate and the altitude of which is determined by means of measuring blocks, the plate may be said to have sine-bar characteristics. The plate 3, in its preferred form, is provided with tapped holes 17 for the reception of screws 20 for fastening work holding clamps 18 on the plate. Clamps 18 are fitted with binding screws 19 which adjustably engage the face of plate 3 and serve as a rest or fulcrum when holding screws 20 are operated to force clamps 18 into engagement with the work 14. The periphery of plate 3 may be graduated and an index pointer 21 provided on the support 1 for reading the graduations to roughly check the readings and calculations more accurately determined by the engagement of pin 16 with selected measuring or gauge blocks 8 supported on plate 7 or, in some instances, directly on commercial measuring plate 4. The periphery of the index plate is recessed at 23 to cooperate with a friction clamping device 24 provided to hold index plate 3 in adjusted position. The support 1 is provided with an opening 22 bushed in the same manner as openings 15 with which openings 15 may be aligned. Opening 22 is known as the index opening or bushing and is located on a vertical line through the center of the support bushing and the same distance from the center of the support bushing as openings 15 in plate 3.

Figure 7:
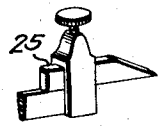
Figure 7 is a perspective view of a scriber used in connection with the height gauge shown in Figure 1.
Figure 3:
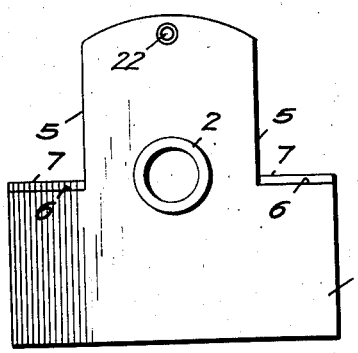
Figure 3 is a front view of Figure 2 with index plate removed.
Figure 4:
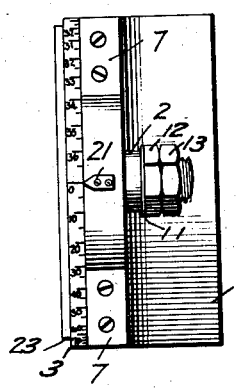
Figure 4 is a top plan view of the support as shown in Figure 3 with the index plate added.
Figure 2:
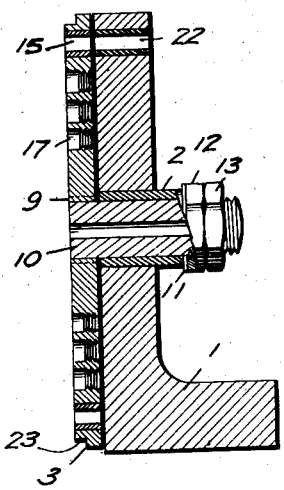
Figure 2 represents a cross-section along the line 2—2 of Figure 1.
Figure 5:
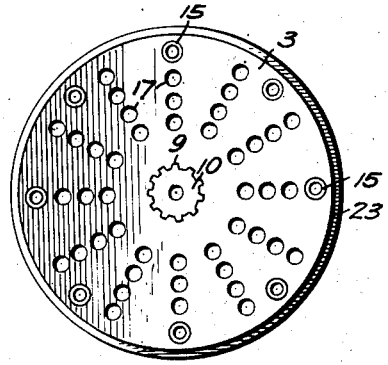
Figure 5 is a front elevational view of the index plate.
Figure 6:
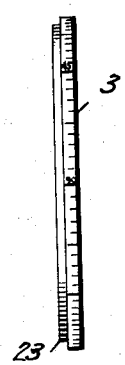
Figure 6 is a side elevation of the index plate shown in Figure 5.

In the operation of the device to lay out an angle, the index plate 3 is located in the zero position by inserting pin 16 through a selected opening 15 and opening 22 in support 1. The index plate is then locked in place and a piece of work clamped thereto. A scriber 25 (Fig. 7), attached to height gauge 26, is used to mark a horizontal line on the work. Gauge or measuring blocks of a height to represent the altitude of a desired angle, the hypotenuse of which is the distance from the support bushing to openings 15, are then placed upon plate 7 and the index plate 3 rotated into position with pin 16 resting on top of the measuring block. The scriber is again drawn horizontally across the plate until it intersects the first inscribed line. The angle formed by the intersecting lines is thus very accurately scribed. Successive sides of a piece of work may be scribed by first laying out an angle representing two sides of the piece of work following the procedure outlined above, then changing the reading of the height gauge by adding to it or subtracting from it the length of the side to be scribed. The angle which the line to be scribed makes with the line last scribed is established by placing a selected measuring block or blocks on the support 7, rotating plate 3 until pin 16 engages the measuring block, locking plate 3 in place and scribing the next line. An entire outline may thus be laid out by following the steps successively. It is often preferred to first establish a center line on the work to facilitate laying out the work from blue-prints. The center line of the layout is found by setting scriber 25 of height gauge 26 on top of pin 16 inserted in hollow shaft or stud bushing 10. The height gauge is read and noted and one-half the diameter of the pin 16 subtracted resulting in the center line of the part being laid out. From this center line, the height gauge scriber 25 is moved the amount of the dimension shown on the blueprint of the part to be laid out and the index plate 3 moved to the angle shown on the blueprint by placing pin 16 in a suitably selected opening 15 and rotating the plate until pin 16 rests upon a block 8 selected to give the desired angle. Plate 3 is then locked in place and the line scribed. Successive lines may be scribed following this procedure. With eight pin receiving openings 15 spaced 45 degrees apart in the disk 3 and two measuring plates 7, it is readily appreciated that angles may be quickly and accurately laid out. It will also be understood by those skilled in the art that this device will enable the outline of work which is to be machined to be accurately and readily scribed. Also, by use of suitable instruments, such as a height gauge 26 and a visual indicator as shown in 27 in Figure 1, the accuracy of machined parts such as jigs, fixtures, gauges, model parts, locations of openings and similar work may be easily checked. As illustrated in Fig. 1, it is preferable to use the visual measuring gauge in connection with the height gauge when measuring work, although the scriber may be used.

Details of construction may be altered or omitted without departing from the spirit of the invention and it is obvious that changes may be made that fall within the scope of the appended claims.

I claim:

1. A layout device comprising a support provided with a plate-orienting indexing means and a predeterminately located measuring-block-supporting surface, a work-supporting plate rotatably mounted on said support and having spaced predeterminately located openings therein, means for fastening to said plate material which is to be laid out or checked, and a pin adapted to be placed in a selected opening in said plate and having a portion adapted to engage said indexing means to orient said plate and to also engage selected measuring blocks placed on said supporting surface.

2. A layout and checking device comprising a support having a precisely plane surface for contact with a commercial surface plate, a face plate mounted on said support for complete rotation with respect thereto, said face plate being provided with work retaining means and a plurality of precisely cylindrical openings predeterminately and circumferentially spaced to have sine bar characteristics, said support being provided with a precisely cylindrical, predeterminately located opening a precisely cylindrical pin of substantially the same diameter as said cylindrical openings in said plate and support and adapted to be received therein with the surfaces of the pin and opening in juxtaposition, whereby said plate may be oriented by placing said pin in a selected opening in said plate and said opening in said support, and work may be laid out or checked by attaching it to said face plate and positioned for scribing or checking with the sides thereof successively in parallel relation with respect to said surface plate by placing said pin in a selected opening and in contact with measuring means of a preselected value located on said surface plate.

3. A layout and checking device comprising a support having a precisely plane surface for contact with a commercial surface plate, a face plate mounted on said support for complete rotation with respect thereto, said face plate being provided with work retaining means and a plurality of precisely cylindrical openings predeterminably and circumferentially spaced to have sine bar characteristics, a precisely cylindrical pin of substantially the same diameter as said cylindrical openings and adapted to be received therein with the surfaces of the pin and opening in juxtaposition, said support being dimensionally reduced to expose a portion of said face plate containing cylindrical openings and to provide a datum plane parallel to said plane surface in close proximity to the axis of rotation of said face plate, whereby work may be laid out or checked by attaching it to said face plate, said pin placed in a selected opening and in contact with said datum plane or measuring means of a preselected value located on said surface plate or said datum plane to bring a side of said work parallel to said surface plate.

4. A layout and checking device comprising a support, a work-supporting plate rotatably mounted thereon, said plate being provided with predeterminately spaced openings having sine bar characteristics, said support being provided with a plate-orienting indexing opening with respect to which said openings in said plate are adapted to be aligned and a readily removable pin receivable simultaneously in a selected opening in said plate and said opening in said support.

5. A layout and checking device comprising a support having a datum plane and a predeterminately located plate-orienting indexing opening, a work supporting plate having predeterminately located openings therein having sine bar characteristics, and a readily removable pin adapted to be placed simultaneously in a selected opening in said plate and said opening in said support to orientate said plate, said pin also being adapted to engage said datum plane or measuring means located thereon.

GEORGE L. BECKER.